United States Patent [19]
Lee

[11] Patent Number: 5,520,440
[45] Date of Patent: May 28, 1996

[54] FOLDABLE SHOCK ABSORBING SEAT

[75] Inventor: Min K. Lee, Seoul, Rep. of Korea

[73] Assignee: Daewoo Heavy Industries Ltd., Incheon, Rep. of Korea

[21] Appl. No.: 365,628

[22] Filed: Dec. 28, 1994

[30] Foreign Application Priority Data

Dec. 28, 1993 [KR] Rep. of Korea ............... 93-30147

[51] Int. Cl.⁶ .................................................. B60N 2/02
[52] U.S. Cl. ............................ 297/378.12; 297/216.13
[58] Field of Search ................... 297/378.1, 378.12, 297/354.1, 378.14, 353, 216.13

[56] References Cited

U.S. PATENT DOCUMENTS

| | | | |
|---|---|---|---|
| 1,762,623 | 6/1930 | Hess | 297/378.1 |
| 2,042,886 | 6/1936 | Ferguson | 297/378.1 X |
| 2,320,370 | 6/1943 | Luker | 297/378.12 X |
| 2,833,336 | 5/1958 | McGregor | 297/378.12 X |
| 3,328,077 | 6/1967 | Krasinski | 297/378.12 X |
| 3,516,710 | 6/1970 | Sherbert et al. | 297/378.12 |
| 3,711,153 | 1/1973 | Cunningham | 297/378.1 X |
| 4,045,082 | 8/1977 | Egert et al. | 297/378.12 X |
| 5,364,165 | 11/1994 | Okamoto | 297/378.1 X |

FOREIGN PATENT DOCUMENTS

| | | | |
|---|---|---|---|
| 918944 | 2/1963 | United Kingdom | 297/378.1 |
| 2055958 | 3/1981 | United Kingdom | 297/378.1 |

*Primary Examiner*—Milton Nelson, Jr.
*Attorney, Agent, or Firm*—Lowe, Price, LeBlanc & Becker

[57] ABSTRACT

A foldable shock absorbing seat for industrial vehicles comprises a seat member; a back member extending upwardly from a rear end of the seat member; a first folding joint for allowing the back member to be folded relative to the seat member; a frame for supporting the seat member and the back member; a second folding joint provided on the frame for enabling the frame to be folded as the back member is folded toward the seat member; and a unit for absorbing shock inflicted on the seat member and the back member, and shock absorbing unit disposed between the frame and the seat and back members.

4 Claims, 4 Drawing Sheets

FOLDABLE SHOCK ABSORBING SEAT

FIELD OF THE INVENTION

The present invention is directed to a seat and, more particularly, to a foldable shock absorbing seat to be mounted on an industrial vehicle such as a forklift, a skid loader, etc.

DESCRIPTION OF THE PRIOR ART

Generally, a shock absorbing seat is extensively employed in industrial vehicles such as a forklift and the like to seek the operator's safety and alleviate his fatigue felt during the course of vehicle driving. One typical example of such a shock absorbing seat is illustrated in FIG. 1. This shock absorbing seat comprises a seat member 11, a back member 13 extending upward from the seat member, an elbow 12 for joining the seat member 11 and the back member 13 together, a support frame 14 for supporting both the seat member 11 and the back member 13 and a shock absorbing unit 15 for affixing both of the seat member 11 and the back member 13 against the support frame 14 in a shock absorbing manner.

The shock absorbing unit 15 includes a bracket 16 and lugs 17, which are disposed at the upper and lower positions of the back member 13 respectively in a spaced apart relationship with each other. And, the support frame 14 is provided with a shock absorber 18, the upper end of which is fastened to the brackets 16, and the support frame 14 is joined to the lugs 17 by way of springs 19. Between the underside of the seat member 11 and the support frame 14, there are disposed yieldable support rods 20 which is intended to absorb a downwardly acting shock. The conventional shock absorbing seat as described above is able to efficiently absorb shock inflicted on the seat member 11 and the back member 13 with the aid of the shock absorber 18 and the springs 19 of the shock absorbing unit 15.

However, in case where such a shock absorbing seat is mounted on the forklift, the back member 13 thereof tends to interfere with or hit against the cabin of the forklift as the seat is removed by rotation or sliding movement out of its original position to provide access to a forklift hood. Particularly, if a vehicle operator attempts to gain access to an engine or a main drive mounted below the shock absorbing seat, the shock absorbing seat has to be rotated rearwardly about its pivot axis to such an extent that an enough working space becomes available. The extent of pivotal movement is however heavily restricted due to the presence of the back member 13 which is far longer in length than the seat member 11.

SUMMARY OF THE INVENTION

Accordingly, it is an object of the invention to provide a shock absorbing seat which can prevent the back member from hitting against the surrounding structures during the pivotal or sliding movement of the shock absorbing seat by enabling the back member to be folded toward the seat member.

To achieve the above object, the present invention provides a foldable shock absorbing seat for use in industrial vehicles, which comprises: a seat member, a back member extending upwardly from a rear end of the seat member, a first folding joint for allowing the back member to be folded relative to the seat member, a frame for supporting the seat member and the back member, a second folding joint provided on the frame for enabling the frame to be folded as the back member is caused to fold toward the seat member and means for absorbing shock inflicted on the seat member and the back member, the shock absorbing means disposed between the frame and the seat member plus the back member.

BRIEF DESCRIPTION OF THE DRAWINGS

Other objects, features and advantages of the invention will become apparent from the following description of the preferred embodiment taken in conjunction with the accompanying drawings in which.

DETAILED DESCRIPTION OF THE PREFERRED EMBODIMENT

Figure 1:
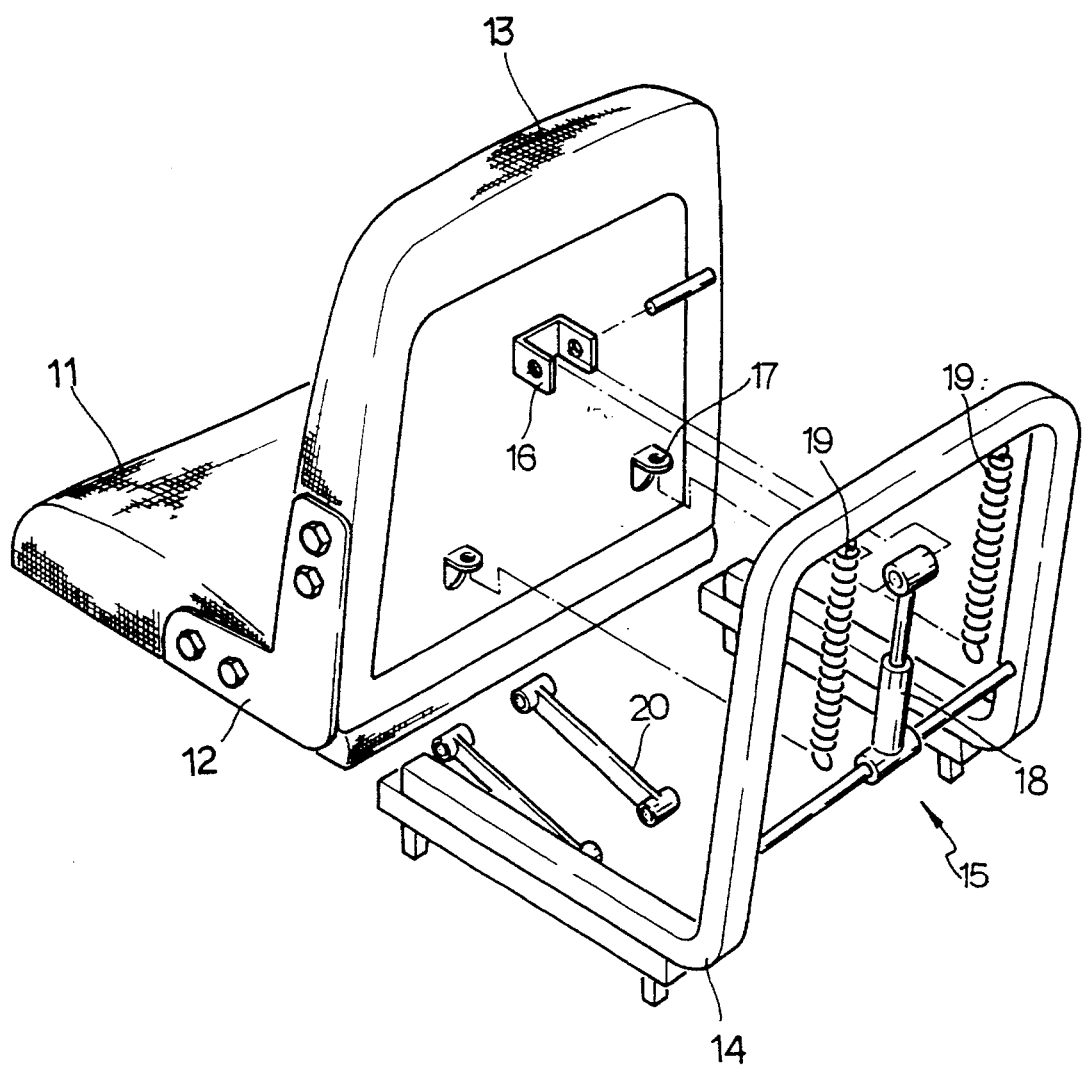
FIG. 1 is a perspective view of a conventional shock absorbing seat.
Figure 2:
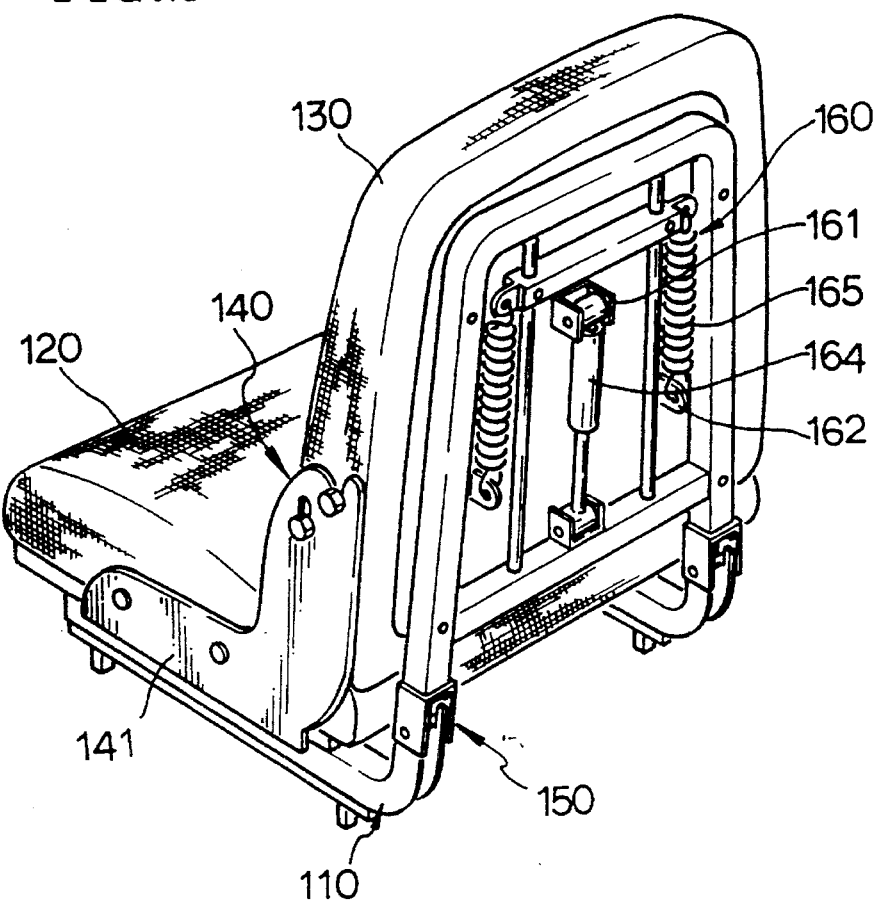
FIG. 2 is a perspective view showing a foldable shock absorbing seat in accordance with the present invention.

Referring now to FIG. 2, there is depicted a foldable shock absorbing seat embodying the invention, which is particularly adapted for use in a forklift. The shock absorbing seat comprises a frame 110 fixedly secured to a chassis of the forklift, a seat member 120 removably mounted to the frame 110, a back member 130 so mounted as to extend upwardly from the rear end of the seat member 120, a first folding joint 140 for enabling the back member 130 to be folded against the seat member 120, a second folding joint 150 for enabling the frame 110 to be folded along with the folding of the back member 130, the second folding joint 150 provided on the frame 110, and a shock absorbing unit 160 for absorbing the shock inflicted on the back member 130 and the seat member 120, the shock absorbing unit disposed between the frame 110 and the seat member 120 plus the back member 130.

Figure 3:
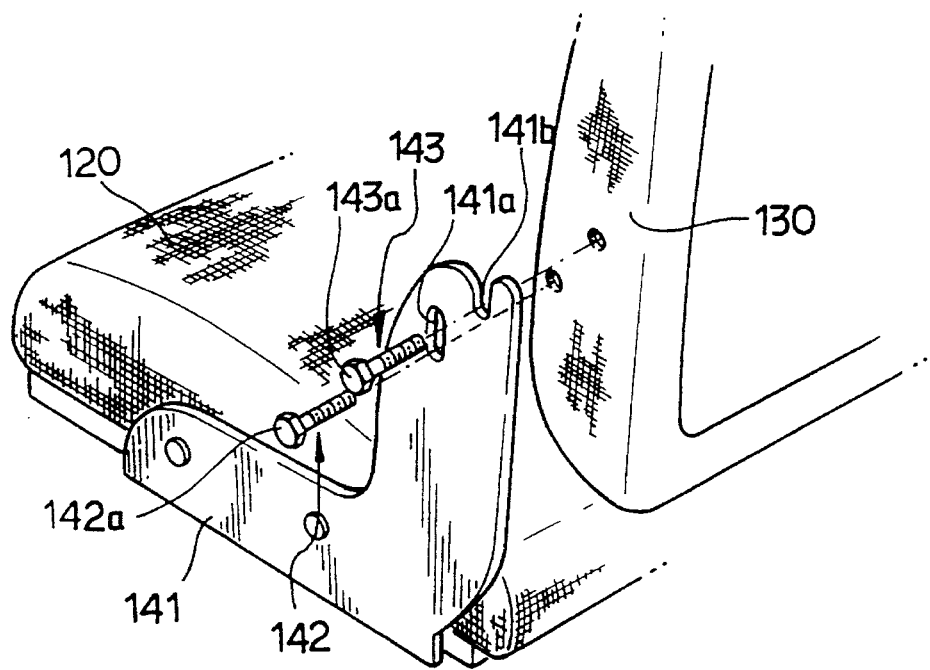
FIG. 3 is a perspective view illustrating the first folding joint of the foldable shock absorbing seat in accordance with the present invention.

The first folding joint 140 serves either to keep the back member 130 fixed with regard to the seat member 120 or to allow same to be folded toward the seat member 120. As best shown in FIG. 3, the first folding joint 140 comprises a connector member 141 which extends upward a predetermined distance at each of opposite lateral sides of the seat member 120. The connector member 141 includes a first slot 141a formed in the longitudinal direction thereof and a second slot 141b with its upper end open, the second slot being in substantially parallel with the first slot 141a. On each of flank sides of the back member 130, there are mounted projectingly a pair of hinge pins 142, one of which is adapted to slidably engage the first slot 141a, and a guide pin 143 which is engageable with the second slot 141b. The first and second slots 141a, 141b are so arranged that the guide pin 143 can be withdrawn from the second slot 141b when the hinge pin 142 is positioned at the upper extremity of the first slot 141a. Furthermore, the connector member 141 is bifurcated at its top to form a front ridge and a rear protrusion. The front ridge is so profiled as to have a gentle curvature, while the rear protrusion is elongated upward enough to prevent the guide pin 143, as withdrawn from the second slot 141b, from sliding over the rear protrusion toward the frame 110. In addition, the hinge pin 142 and the guide pin 143 are formed with stopper heads 142a, 143a respectively on their respective free end.

Figure 4:
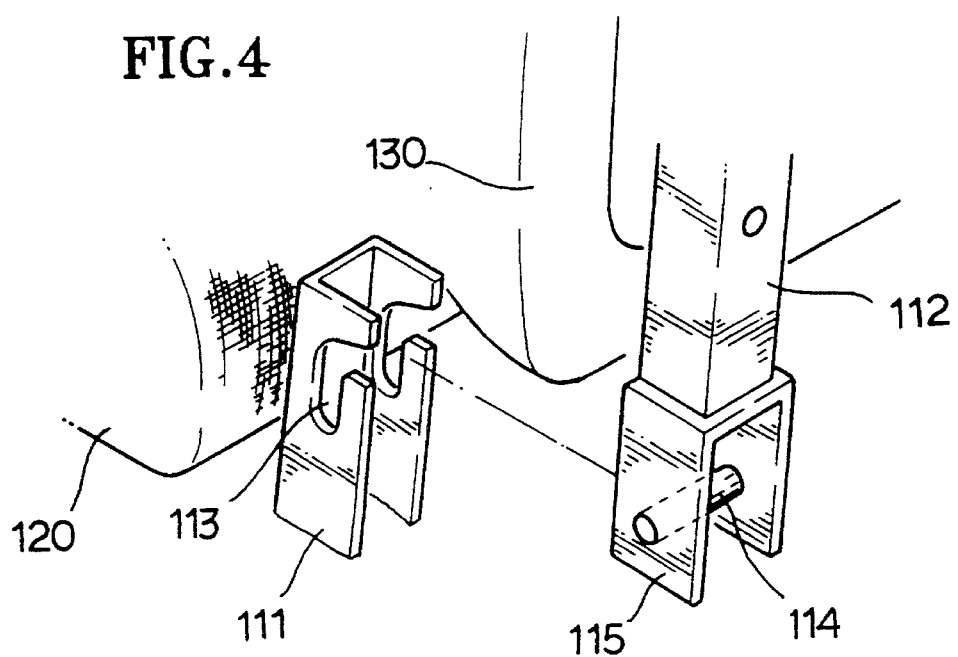
FIG. 4 is a fragmentary perspective view showing the second folding joint of the inventive shock absorbing seat.

The second foldable joint 150 is intended to enable the frame 110 to be folded along with the back member 130 as the latter is folded toward the seat member 120. As clearly shown in FIGS. 2 and 4, the second folding joint 150 includes a lower segment 111 of the frame 110 supporting the seat member 120 and an upper segment 112 of the frame 110 supporting the back member 130. The lower segment 111 is formed with a guide groove 113 at its upper end. And the upper segment 112 is provided at its lower end with a sliding pin 114 which is engageable with the guide groove 113, the sliding pin supported by a bracket 115.

Figure 5:
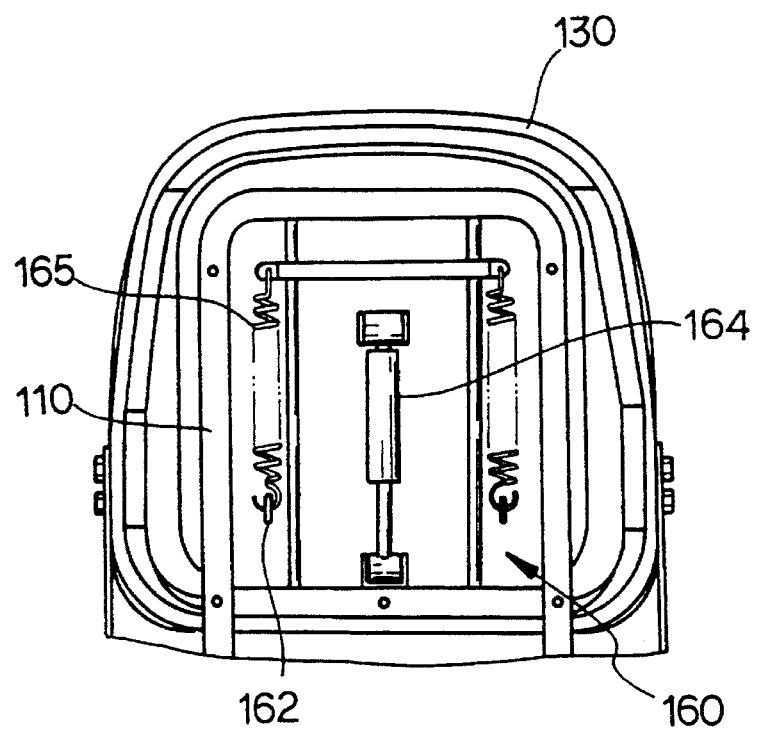
FIG. 5 is a partially cut away rear elevation view best showing the shock absorbing unit attached to the frame and the back member.

The shock absorbing unit 160 functions as an absorber of those shocks exerted to the seat member 120 and the back member 130, as depicted in FIGS. 2 and 5. The shock absorbing unit 160 includes a bracket 161 and lugs 162, each of which is affixed at the upper and lower portions of the back member 130. The bracket 161 is connected by means of a shock absorber cylinder 164 to the frame 110, and, on the other hand, the lugs 162 are connected through a pair of springs 165 to the frame 110.

The operation of the shock absorbing seat as set forth above will now be explained below.

Figure 6:
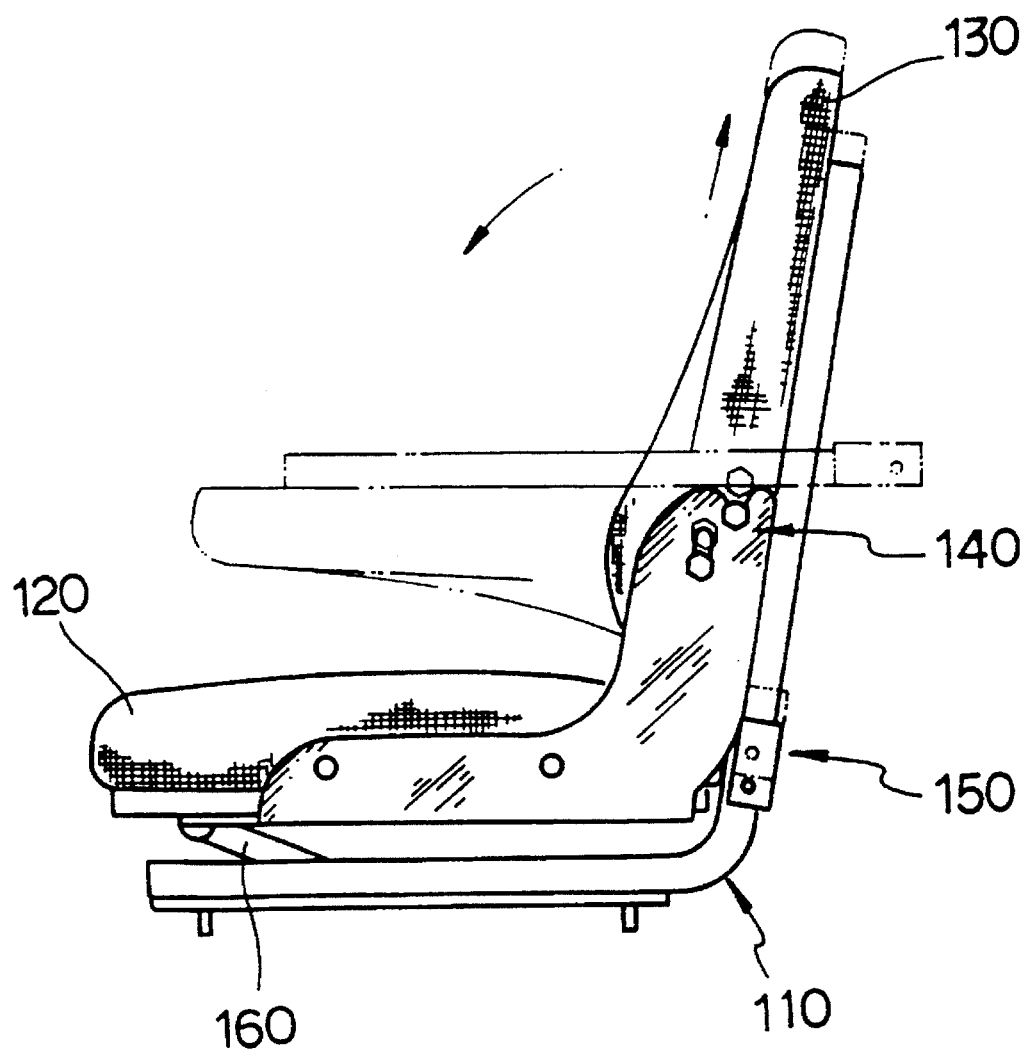
FIG. 6 is an explanatory view illustrating the back member folded toward the seat member in phantom line.

As shown in FIG. 6, to render the back member 130 affixed relative to the seat member 120, the hinge pin 142 and the guide pin 143 should engage the first and second slots 141a and 141b, respectively, of the first folding joint 140; and the sliding pin 114 should come into engagement with the guide groove 113 of the second folding joint 150. In order for the back member 130 to be folded against the seat member 120, the back member 130 is first pulled in the upward direction away from the seat member 120: During such a process, the hinge pin 142 and the guide pin 143 are slidingly moved upward along the first slot 141a and the second slot 141b, respectively, so that the hinge pin 142 can be eventually positioned at the upper extremity of the first slot 141a and the guide pin 143 can be withdrawn from the second slot 141b. At this moment, the sliding pin 114 mounted on the upper segment 112 is removed out of the guide groove 113. Under this state, the back member 130 is swing counterclockwise to be folded about the hinge pin 142 retained in the first slot 141a.

On the other hand, the back member 130 is swing clockwise about the hinge pin 142, when the shock absorbing seat needs to be unfolded. Concurrently, the guide pin 143 is moved downward along the surface of the rear protrusion of the connector member 141 to reach somewhere at the entrance of the second slot 141b. In this process, the guide pin 143 is caused to strike against the rear protrusion of the connector member 141, because the rear protrusion of the connector member 141 is formed higher than the front ridge. At the same time, the sliding pin 114 carried by the upper frame 112 is positioned at the entrance of the guide groove 113 of the lower segment 111. In that circumstance, the back member 130 may be pressed downward, thereby causing the guide pin 143 and the sliding pin 114 to slide down into the second slot 141b and the guide groove 113, respectively. As a result, the back member 130 is fixed with respect to the seat member 120 in an unfolded condition.

While the invention has been shown and described with reference to a preferred embodiment, it should be apparent to those skilled in the art that many changes and modifications may be made without departing from the spirit and scope of the invention as defined in the claims.

What is claimed is:

1. A foldable shock absorbing seat for industrial vehicles, which comprises:

a seat member;

a back member extending upwardly from a rear end of said seat member, said back member being formed with flanks on opposite sides thereof;

first folding joint means for allowing said back member to be folded relative to said seat member;

a frame having a lower segment for supporting said seat member and an upper segment for supporting said back member;

second folding joint means provided on said frame for enabling said frame to be folded as said back member is folded toward said seat member; and means for absorbing shock inflicted on said seat member and said back member, said shock absorbing means disposed between said frame and said seat and back members, said first folding joint means comprising a connector member fixedly secured to at least one of opposite flanks of said seat member, said connector member having a first slot and a second slot open at its top end, and a pair of hinge pins affixed to opposite flanks of said back member, one of said hinge pins slidably engaging with said first slot, and a guide pin for removably engaging said second slot.

2. The foldable shock absorbing seat as recited in claim 1, wherein each of said hinge pins and said guide pin is formed with a stopper head at its free end.

3. The foldable shock absorbing seat as recited in claim 1, wherein said lower segment has a guide groove at its end adjacent to said upper segment, said upper segment having a sliding pin engageable with said guide groove.

4. The foldable shock absorbing seat as recited in claim 3, wherein said shock absorbing means includes a shock absorber cylinder and a pair of springs, each of which extends between said back member and said frame.

* * * * *